United States Patent [19]

Dines et al.

[11] 4,299,892

[45] Nov. 10, 1981

[54] AMORPHOUS AND SHEET DICHALCOGENIDES OF GROUP IVB, VB, MOLYBDENUM AND TUNGSTEN

[75] Inventors: Martin B. Dines, Santa Ana, Calif.; Russell R. Chianelli, North Branch, N.J.

[73] Assignee: Exxon Research & Engineering Co., Florham, N.J.

[21] Appl. No.: 172,971

[22] Filed: Jul. 28, 1980

Related U.S. Application Data

[63] Continuation of Ser. No. 47,491, Jun. 11, 1979, abandoned, which is a continuation-in-part of Ser. No. 641,424, Dec. 17, 1975, abandoned.

[51] Int. Cl.$^3$ .................. H01M 6/14; H01M 4/60; H01M 4/58; H01M 6/04
[52] U.S. Cl. .................. 429/194; 429/213; 429/218; 429/199; 429/201; 423/508; 432/561 R; 252/439
[58] Field of Search .............. 252/439, 520; 423/561 R, 508, 509; 429/194, 199, 201, 218, 213

[56] References Cited

U.S. PATENT DOCUMENTS

| | | | |
|---|---|---|---|
| 1,948,408 | 2/1934 | Watts et al. | 208/143 X |
| 2,145,657 | 1/1939 | Ipotieff | 208/215 X |
| 2,654,696 | 10/1953 | La Porte | 208/264 |
| 2,902,360 | 9/1959 | Jurla | 75/84 |
| 3,026,175 | 3/1962 | Kulifay | 423/509 |
| 3,252,895 | 5/1966 | Glein et al. | 208/264 |
| 3,275,567 | 9/1966 | Keith et al. | 252/439 |
| 3,306,701 | 2/1967 | Anderson et al. | 423/509 |
| 3,338,822 | 8/1967 | Groszak | 208/10 |
| 3,441,500 | 4/1969 | Winderlich | 208/213 |
| 3,453,217 | 7/1969 | Kozlowski et al. | 252/430 |
| 3,583,900 | 6/1971 | Cotses | 208/8 LE |
| 3,622,498 | 11/1971 | Stalfa et al. | 208/108 |
| 3,657,111 | 4/1972 | Glein | 208/106 |
| 3,663,431 | 5/1972 | Wogner | 208/143 |
| 3,677,970 | 7/1972 | Mertnweller et al. | 252/431 |
| 3,682,813 | 8/1972 | Dun et al. | 208/59 |
| 3,686,137 | 7/1972 | Gotser | 252/437 |
| 3,714,339 | 1/1973 | Vecht | 423/509 |
| 3,761,397 | 9/1973 | Gotis et al. | 208/143 |
| 3,761,425 | 9/1973 | Bresseler et al. | 252/439 |
| 3,766,064 | 10/1973 | Gonble et al. | 252/25 |
| 3,791,867 | 2/1974 | Broodhood et al. | 429/194 X |
| 3,793,081 | 2/1974 | Vonph | 136/86 D |
| 3,920,743 | 11/1975 | Boeneler et al. | 260/580 |
| 3,988,164 | 10/1976 | Liang et al. | 429/191 |
| 4,002,492 | 1/1977 | Rao | 429/194 |
| 4,009,052 | 2/1977 | Whittingham | 429/194 |
| 4,055,630 | 10/1977 | McCoy et al. | 423/509 |
| 4,060,667 | 11/1977 | Ashew et al. | 429/218 X |
| 4,084,046 | 4/1978 | Whittingham | 420/218 X |
| 4,208,394 | 6/1980 | Chianelli | 425/561 R |

FOREIGN PATENT DOCUMENTS

1123136 8/1968 United Kingdom .
1471589 4/1977 United Kingdom .

OTHER PUBLICATIONS

"Low Temp. Solution Preparation . . .", Chianelli et al., Inorganic Chem., vol. 17, No. 10, 1978, pp. 2758–2762, 3/78.

"Zur Reindarstellug von Uranverbindugen," E. Wilke-Dorfurt, Wessenschoftliche Veroffetl Siemens Werken, vol. 1, pp. 143–146, (1920).

"Notiz uber MoS$_3$", Biltz et al., Zeitschrift fur Anorganische und Allgemeine Chemie, Band 248, pp. 172–174, (1941).

"Die Darstellung von Seleniden aus Selenwasserstuff . . ." Myser et al. Bukle, Monatsh 54, pp. 235–250, (1925).

"Die Darstellung von Metalltelluriden aus Telluriunaseictuff and Metallsalylouingen," Brukle, Monatsh 45, pp. 471–484, 1925.

"Uransulfide", Strotzer, Schneider and Biltz, Zeitschrift fur Anorganishe und Aligemeine Chemie, 243, pp. 307–321, (1949).

"Preparation of Metal Sulfide from Organic Solvents", Lutz and Haeuseler, Z. Naturforsch 26 b, pp. 1096–1097, (1971).

"Preparation of Chromium Sulfide from Organic Solvents", Lutz, Haeuseler and Becker, Z. Naturforsch 29 b, pp. 385–388, (1974).

"The Role of Iron Sulfides in the Accumulation of Mo in Sed. Rocks of the Reduced Zone", D.F. Korolev, Geochemistry, No. 4, pp. 452–463, (1958).

Some Properties of Thiomolybdic Solutions", Ponomarev et al., Gorno–Met. Inst. Geol. Gorneo Delo, Met., No. 16, pp. 369–376, 1959.

"Preparation and Properties of Some Ternary Selinides and Tellurides of RH," Plovnick and Wold, Inorganic Chem. 7, No. 12, 2596–2598, (1968).

"A High Pressure Form of Palladium Disulfide" Munson and Kasper, Inorganic Chem. 8, No. 5, pp. 1198–1199, May 1969.

"Critical Examination of Platinum Sulfide Precipitation", Jackson et al., Analytical Chemistry 22, No. 6, pp. 813–817, June 1950.

"Thiomelallates of the Group–Eight Metals," L. R. Pittwell, Nature 207, 11181–1182, (1965).

"Crystalline Polysulfides of Heavy Metals", Hofmann et al., Berichte 3E, 3090, (1903).

"Crystalline Polysulxider of Heavy Metals", Hofmann et al., Bevichte 37 245, (1904).

Schmidt et al., Lab. Anorg. Anal. Chem. Univ. Tuefinger Tuefevger, Ger. Teil B1973, "Rh Sulfides as liq. Phase Hydrogenation Catalysts, A Comparison with Mo Sulifde and Co Polysulfide", Broadbent, et al. J.A.C.S., 1519–1523, 1954.

"Feber unige den Sulfiden und Schwefebasen Analoge–Selenverbindungen" Uelsmann, Annalen der Chemie 116, 122–127, (1860).

Selemuin Compounds Analogous to Sulfides and Sulfer Bores, Uelsmann, Annalen der. Chemie, 116, 122–127, (1869).

Sulfides Report A–C, Dörfunt, Win. Voroffertl, (1920), (1975), 1957, and ", Destructive Hydrogenation" Farbentnd 1926 Chem. Abs. vol. 27, 1933, p. 4455.

Note on Selenides and Tellurides of Ir and Rh. Biltz, Z. Anorg. Allgem. Chemie 233:282–285, (1937).

The Systematic Study of Affinity, The Sulfides of Rhodium. Juza et al., Z. Anorg. Allgem. Chem. 225, 369–385, 1935.

The Compound $RuS_2$ and its Structure W. F. DeJong et al., Lab. of Mineralogy of the Superior Tech. School at Delf. 1927.

The Systematic Study of Affinity–The Sulfides of Ir, Biltz et al., Z. Anorg. Allgem. Chem. 233, 257–281, (1937).

"Uranium Compounds", Alibegoff, Annalen der Chemie 233:117–143, (1886).

Vol 79, 1973 Chem. Abst. 60976P, Ruldorff P. 548.

Vol. 76, 1972 Chem. Abstracts 18930g, Peshovd, p. 310.

Prep. & Cryst. of Mo and W Sulfides Wildermanch et al. 309–318.

Die Darstellung von Selenider aus Tellurwasserstuff und Metallsalzlosungen" Moch et al., approved in Monatsch 54, 1925, pp. 235–250.

J. W. Mellon, Comprehensive Treatise of Inorganic and Theoretical Chem., vol. IX p. 814

Chem. Abst., The American Chem. Society, vol. 81, p. 383, 142455y.

"Monodispersed Tantalum Disulfide and Adsorption Complexes with Cations", Murphy and Hull J. Chem. Phys. 62, pg. 973–978 (1975).

*Primary Examiner*—Delbert E. Gantz
*Assistant Examiner*—William G. Wright
*Attorney, Agent, or Firm*—Joseph J. Allocca

[57] ABSTRACT

Dichalcogenides of Group IVb, Vb, molybdenum and tungsten of two new forms have been discovered. The two new forms are the amorphous and layered-sheet configurations. In particular, the dichalcogenides of Group IVb, Vb, molybdenum and tungsten, i.e. $Z(MX_2)_n$ wherein M is the metal and X is the chalcogen, n is at least about 20,000 and Z is the number of such $(MX_2)_n$ sheets ranging from 1–10, can be described as possessing a "rag-like" structure representing a system consisting of single or several stacked but randomly folded and disordered layers or sheets having dimensions (as determined by TEM) corresponding to about 6.2 to 62 Å in thickness, about 500 Å minimum length by about 500 Å minimum width. Broadly the rag-like $(MX_2)_n$ can be likened to a stack of polymer sheets wherein each sheet is one atom thick. These sheets of $(MX_2)_n$ are prepared by the controlled heating (in a flowing stream of $H_2/H_2S$) of amorphous $MX_2$ obtained by the monaqueous low temperature precipitation of $MX_2$ from mixtures of the metal salt and sources of sulfur, selenium or tellurium.

25 Claims, 4 Drawing Figures

AMORPHOUS AND SHEET DICHALCOGENIDES OF GROUP IVB, VB, MOLYBDENUM AND TUNGSTEN

CROSS-REFERENCE TO RELATED APPLICATION

This is a continuation of application Ser. No. 47,491, filed June 11, 1979, now abandoned which is a continuation-in-part of Ser. No. 641,424 filed Dec. 17, 1975 now abandoned.

BRIEF DESCRIPTION OF THE INVENTION

Dichalcogenides of Group IVb, Vb, molybdenum and tungsten of two new physical forms, amorphous and sheet configurations, have been discovered. The dichalcogenides of Group IVb, Vb, molybdenum and tungsten, preferably molybdenum, titanium, niobium and vanadium of sheet conformation, broadly represented by the formula $Z(MX_2)n$ wherein M represents the metal, X represents the chalcogen (i.e. sulfur, selenium or tellurium, preferably sulfur) and n is at least 20,000 and Z is the number of such $(MX_2)_n$ sheets ranging from 1–10, can be described as possessing a "rag-like" structure representative of a system consisting of from one to several stacked but randomly folded and disordered layers of the dichalcogenides having dimensions as determined by TEM corresponding to about 6.2–62 Å in thickness, at least 500 Å in length and at least 500 Å in width. This "rag-like" structure can be broadly compared to a stack of polymer sheets wherein each sheet is at least one atom thick. The existence of $MoS_2$ in this structure demonstrates the strongly anisotiopic and macromolecular nature of this compound.

Dichalcogenides of Group IVb, Vb, molybdenum and tungsten of a sheet configuration have been discovered. These materials can be described as possessing a rag-like structure representing a system consisting of single or several stacked and randomly folded and disordered layers having dimensions corresponding to about 6.2 to 62 Å in thickness (representing 1 to 10 layers of sheets), about 500 Å minimum length by about 500 Å minimum width, preferably at least 1000 Å × 1000 Å, perpendicular to the thickness. Broadly, the dichalcogenides of this invention can be represented by the formula $Z(MX_2)_n$ wherein M is the Group IVb, Vb, molybdenum or tungsten, X is the chalcogen sulfur, selenium or tellurium, preferably sulfur) n is at least 20,000, preferably at least 80,000 and Z represents the number of such stacked sheets ranging from 1–10. The rag-like $Z(MX_2)_n$ can be compared to a stack of polymer sheets wherein each sheet is one atom thick.

Single and multiple sheets of the dichalcogenides of the formula $Z(MX_2)_n$ wherein M is a metal selected from the group consisting of Group IVb, Vb, molybdenum and tungsten transition metals of the Periodic Table of the Elements (Sargent-Welche Periodic Table, Copyright 1968), preferably molybdenum, titanium, niobium and vanadium, X is a chalcogen selected from the group consisting of sulfur, selenium, tellurium and mixtures thereof, preferably sulfur, n is at least 20,000, preferably at least 80,000 and Z is the number of such $(MX_2)_n$ stacked sheets ranging from 1–10, are prepared by the controlled heating in an atmosphere of 15% $H_2S/H$ on an amorphous product of the formula $MX_2$ which is itself prepared by the low temperature ($-78°$ to 250° C., preferably 25°–250° C.) nonaqueous precipitation of the $MX_2$ compounds from mixtures of the salts of said Group IVb, Vb, molybdenum and tungsten transition metals, the anions of the metal salts being halide, acetate, carboxylate, nitrate and sulfates, etc., with slurries or solutions of sources of sulfide, selenide or telluride ions, said source conveniently being $Li_2X$, $Na_2X$, $K_2X$, $LiHX$, $NaHX$, $KHX$, $(NH_4)_2X$, $(NH_4)HX$, $(RNH_3)_2X$, $(R,R'NH_2)_2X$, $(RR'R''NH)_2X$ wherein R, R' and R'' are the same or different and are selected from the group consisting of $C_1$–$C_{20}$ alkyl or $C_6$–$C_{20}$ aryl, preferably $C_1$–$C_8$ alkyl or $C_6$–$C_{12}$ aryl, and X is selected from the group consisting of sulfur, selenium, tellurium and mixtures thereof, preferably sulfur. The mixing is carried out in the absence of aqueous-protic solvents. By stating that the reaction is carried out in the absence of an aqueous-protic solvent means that the reaction can be run neat (i.e. without any added solvent when the reactants are already in the liquid phase) or, when necessary, in an added non-aqueous aprotic solvent selected from the group consisting of $C_4$–$C_8$ ethers, acetonitrile, benzonitrile, pyridine, pripionitrile, N-methylformamide, dimethylformamide (DMF) 1,2-dimethoxyethane, propylene carbonate, anhydrous ammonia, aromatics of $C_6$–$C_{20}$, molten sulfur, sulfur dioxide, diglyme, ethylacetate, $C_4$–$C_5$ esters, sulfolane, dimethylsulfite, tributylphosphite, $C_1$–$C_{30}$ amines, $C_5$–$C_{12}$ alkanes, anhydrous acids such as formic acid, glacial acetic acid, alkyl halides of from 1 to 20 carbons and aryl halides of from $C_6$–$C_{20}$. Tetrahydrofuran (THF) dimethylformamide chlorobenzene, chloroform, pyridine and propylene carbonate may be used as solvents of choice.

Reaction of the components proceeds spontaneously upon mixing. The products may be isolated by filtration and washing, using one of the solvents recited above, or by pumping off any byproduct if it is volatile. The products of this low temperature precipitation are amorphous products, i.e. amorphous to X-ray. A number of compounds of the formula $MX_2$, wherein the constituents are as defined above, may be prepared by the instant technique which cannot be synthesized via the methods of the prior art, i.e., aqueous or high temperature solid state methods. $VS_2$ is a compound previously not preparable. The preferred compounds are $TiS_2$, $ZrS_2$, $HfS_2$, $VS_2$, $NbS_2$, $TaS_2$ and $MoS_2$.

The amorphous products produced above are converted into sheets of metal dichalcogenide $(MX_2)_n$ wherein n is at least 20,000 by controlled heating at temperatures of from about 250° to 400° C., preferably 300°–400° C.

PRIOR ART

The Group IVb, Vb and molybdenum and tungsten transition metals dichalcogenides ($MX_2$ wherein M is Ti, Zr, Hf, V, Nb Nb, Ta, Mo and W and X is S, Se and Te have traditionally been prepared when preparation was possible at all, by high temperature reactions. The dichalcogenides have attracted great interest because of their highly anisotropic properties and intercalation properties. Intercalates made using various chalcogenides are useful as lubricants, battery cathodes and superconductors. (See Gamble et al U.S. Pat. No. 3,766,064 herein incorporated by reference). However, a major drawback in the use of chalcogenides is the difficulty encountered in their preparation. These materials of composition $MX_2$ cannot be prepared in aqueous solution because of the susceptibility of the $M^{+3,4,5}$ ion to hydrolysis or to formation of complex oxo ions (Cotton and Wilkenson, "Advanced Inorganic Chemistry" 2d ed. Interscience, New York, 1966). For example, TiCl$_4$ in water will immediately react to form white insoluble TiO$_2$ and HCl. While other metal sulfides such as CuS, SnS$_2$ and As$_2$S$_3$ can be precipitated from aqueous solutions, the transition metal dichalcogenides of Group IVb, Vb and molybdenum and tungsten cannot be precipitated from aqueous solutions (but note, hydrated MoS$_3$ has been precipitated from aqueous solutions (A. F. Clifford, "Inorganic Chemistry of Qualitative Analysis", Prentice-Hall, Inc. 1961).

Low temperature precipitation of solids from solution, however, has the advantages of low cost and also permits preparation of a wide variation of materials of composition and properties not accessible by other means. Recently low temperature precipitation has been applied in preparing materials traditionally prepared by solid state or metallurgical methods. For example, ternary ferrites and titanites can be precipitated from aqueous solutions (P.E.D. Morgan, J. Am. Ceram. Soc. 57, 11, 499 (1974)) whereas previously these materials were prepared by solid state technique at high temperatures. Another example is the preparation of intermetallic compounds by reduction of salts of the desired compounds in aqueous solution at 1 atm. and 100° C. (S. M. Kulifay, J. Am. Chem. Soc. 83, 4916 (1961)). Materials prepared by this method are finely divided and extremely active.

SUMMARY OF THE INVENTION

Dichalcogenides of Group IVb, Vb, molybdenum and tungsten of two new physical forms, amorphous and sheet configurations, have been discovered. The dichalcogenides of Group IVb, Vb, molybdenum and tungsten, preferably molybdenum, titanium, niobium and vanadium of sheet conformation, broadly represented by the formula $Z(MX_2)_n$ wherein M represents the metal, X represents the chalcogen (i.e. sulfur, selenium or tellurium, preferably sulfur) and n is at least 20,000 and Z is the number of such $(MX_2)_n$ sheets ranging from 1–10, can be described as possessing a "rag-like" structure representative of a system consisting of from one to several stacked but randomly folded and disordered layers of the dichalcogenides having dimensions as determined by TEM corresponding to about 6.2–6.2 Å in thickness, at least 500 Å in length and at least 500 Å in width. This "rag-like" structure can be broadly compared to a stack of polymer sheets wherein each sheet is at least one atom thick. The existence of MoS$_2$ in this structure demonstrates the strongly anisotiopic and macromolecular nature of this compound.

Dichalcogenides of Group IVb, Vb, molybdenum and tungsten of a sheet configuration have been discovered. These materials can be described as possessing a rag-like structure representing a system consisting of single or several stacked and randomly folded and disordered layers having dimensions corresponding to about 6.2 to 62 Å in thickness (representing 1 to 10 layers of sheets), about 500 Å minimum length by about 500 Å minimum width, preferably at least 1000 Å × 1000 Å, perpendicular to the thickness. Broadly, the dichalcogenides of this invention can be represented by the formula $Z(MX_2)_n$ wherein M is the Group IVb, Vb, molybdenum or tungsten, X is the chalcogen sulfur, selenium or tellurium, preferably sulfur) n is at least 20,000, preferably at least 80,000 and Z represents the number of such stacked sheets ranging from 1–10. The rag-like $Z(MX_2)_n$ can be compared to a stack of polymer sheets wherein each sheet is one atom thick.

Single and multiple sheets of the dichalcogenides of the formula $Z(MX_2)_n$ wherein M is a metal selected from the group consisting of Group IVb, Vb, molybdenum and tungsten transition metals of the Periodic Table of the Elements (Sargent-Welche Periodic Table, Copyright 1968), preferably molybdenum, titanium, niobium and vanadium, X is a chalcogen selected from the group consisting of sulfur, selenium, tellurium and mixtures thereof, preferably sulfur, n is at least 20,000, preferably at least 80,000 and Z is the number of such $(MX_2)_n$ stacked sheets ranging from 1–10, are prepared by the controlled heating in an atmosphere of 15% H$_2$S/H of an amorphous product of the formula MX$_2$ which is itself prepared by the low temperature ($-78°$ to 250° C., preferably 25°–250° C.) nonaqueous precipitation of the MX$_2$ compounds from mixtures of the salts of said Group IVb, Vb, molybdenum and tungsten transition metals, the anions of the metal salts being halide, acetate, carboxylate, nitrate and sulfates, etc., with slurries or solutions of sources of sulfide, selenide or telluride ions, said source conveniently being Li$_2$X, Na$_2$X, K$_2$X, LiHX, NaHX, KHX, (NH$_4$)$_2$X, (NH$_4$)HX, (RNH$_3$)$_2$X, (R,R'NH$_2$)$_2$X, (RR'R''NH)$_2$X wherein R, R' and R'' are the same or different and are selected from the group consisting of C$_1$–C$_{20}$ alkyl or C$_6$–C$_{20}$ aryl, preferably C$_1$–C$_8$ alkyl or C$_6$–C$_{12}$ aryl, and X is selected from the group consisting of sulfur, selenium, tellurium and mixtures thereof, preferably sulfur. The mixing is carried out in the absence of aqueous solvents. By stating that the reaction is carried out in the absence of an aqueous protic solvent means that the reaction can be run neat (i.e. without any added solvent when the reactants are already in the liquid phase) or, when necessary in an added nonaqueous aprotic solvent selected from the group consisting of C$_4$–C$_8$ ethers, acetonitrile, benzonitrile, pyridine, propionitrile, N-methylformamide, dimethylformamide (DMF) 1,2-dimethoxyethane, propylene carbonate, anhydrous ammonia, aromatics of C$_6$–C$_{20}$, molten sulfur, sulfur dioxide, diglyme, ethylacetate, C$_4$–C$_5$ esters, sulfolane, dimethylsulfite, tributylphosphite, C$_1$–C$_{30}$ amines, C$_5$–C$_{12}$ alkanes, anhydrous acids such as formic acid, glacial acetic acid, alkyl halides of from 1 to 20 carbons and aryl halides of from C$_6$–C$_{20}$. Tetrahydrofuran (THF) dimethylformamide chlorobenzene, chloroform, pyridine and propylene carbonate may be used as solvents of choice.

Reaction of the components proceeds spontaneously upon mixing. The products may be isolated by filtration and washing, using one of the solvents recited above, or by pumping off any byproduct if it is volatile. The products of this low temperature precipitation are amorphous products, i.e. amorphous to X-ray. A number of compounds of the formula MX$_2$, wherein the constituents are as defined above, may be prepared by the instant technique which cannot be synthesized via the methods of the prior art, i.e., aqueous or high temperature solid state methods. VS$_2$ is a compound previously not preparable. The preferred compounds are TiS$_2$, ZrS$_2$, HfS$_2$, VS$_2$, NbS$_2$, TaS$_2$ and MoS$_2$.

The amorphous products produced above are converted into sheets of metal dichalcogenide $(MX_2)_n$ wherein n is at least 20,000 by controlled heating at temperatures of from about 250° to 400° C., preferably 300°–400° C.

The instant invention relates to the low temperature (−78° C.–250° C., preferably 25°–250° C.) precipitation from nonaqueous aprotic solution of amorphous Group IVb, Vb and molybdenum and tungsten transition metal dichalcogenides, most particularly, the disulfides from nonaqueous aprotic solvents and to the products obtained by such precipitation and, in another embodiment to sheets (i.e. rag-like) dichalcogenides of the formula $Z(MX_2)_n$ per sheet wherein M, X and Z are as previously defined and n is at least 20,000, wherein the material consists of single or multiple stacked sheet systems having the dimensions (as determined by TEM) of about 6.2 to 62 Å thick, about 500 Å long by about 500 Å wide which are themselves prepared by the controlled heating, at from 250° to 400° C., in an $H_2$/15% $H_2S$ atmosphere, of the previously obtained amorphous $MX_2$. In yet another embodiment, the layered sheet $(MX_2)_n$ material can be prepared in one step by the nonaqueous precipitation of the material from the previously recited metal salts and chalcogen sources (either neat or in a nonaqueous, anhydrous solvent) at a temperature of from about 250°–400° C. Typically, a metal salt of the transition metal such as $TiCl_4$ is reacted with a solution of, or a slurry of a convenient sulfide, selenide or telluride ion source such as $Li_2S$, hydrosulfide salt (i.e. $NH_4HS$, $NaHS$), $(NH_4)_2S$, $Na_2S$, $(RNH_3)_2S$, $(R,R'NH_2)_2S$, $(R,R',R''NH)_2S$, wherein R, R' and R'' are the same or different $C_1$–$C_{20}$ alkyl or $C_6$–$C_{20}$ aryl, preferably $C_1$ to $C_8$ alkyl or $C_6$–$C_{12}$ aryl, $Li_2Se$, $Li_2Te$, $(NH_4)_2Se$ in a nonaqueous anhydrous solvent such as THF, ethers, acetonitrile, DMF, molten sulfur, etc. The reaction which takes place is:

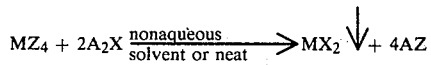

M=IVb, Vb or molybdenum or tungsten transition metals; A=alkali metal, $NH_4^+$, $R,R',R''NH^+$, $R,R'NH_2^+$, or other cation as previously defined; Z=convenient anion such as Cl, Br, I, acetate, carboxylate, nitrate, etc., as recited above; X=sulfur, selenium or tellurium, preferably sulfur. The preferred $A_2X$ is $Li_2S$.

Any convenient source of $M^{+2\rightarrow+5}$, preferably $M^{+4}$ and $M^{+5}$ can be used. Complexes formed in solution which can be isolated as solids may be used as $M^{+4}$ source. In some cases (such as Nb and Ta) a pentavalent salt may be used directly because reduction of $M^{+5}$ to $M^{+4}$ occurs, for example:

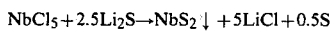

The transition metal salts are desirably, although not necessarily, soluble in organic solvents such as THF since it is possible to conduct the reaction neat in all cases. Therefore, solution concentrations are not critical. Anions, which are envisioned as generating the metal salt, are selected from the group consisting of halides, themselves selected from the group consisting of fluorine, chlorine, bromine and iodine, acetates, carboxylates, perfluorocarboxylates, amines, acetylacetonates, hexafluoroacetylacetonates and nitrates and sulfates, wherein in all cases, the carbonaceous moiety of the anion is a $C_1$ to $C_3$ hydrocarbon or fluorocarbon.

Typical nonaqueous anhydrous solvents which may be used when neat reactions are undesired are acetonitrile, benzonitrile, propionitrile, alkyl halides of from 1 to 20 carbon atoms, arylhalides of from $C_6$ to $C_{20}$ carbon atoms, 1,2, dimethoxyethane, diglyme, N-methylformamide, dimethylformamide, ethers of from $C_4$ to $C_8$, ammonia, molten sulfur, sulfur dioxide, ethylacetate, esters of from $C_4$–$C_8$, aromatics of $C_6$–$C_{20}$ carbons, preferably $C_6$ to $C_{12}$, most preferably benzene, pyridine, sulfolane, tributylphosphate, anhydrous acids such as formic acid, glacial acetic acid, propylene carbonate, tributylphosphate, dimethylsulfite, $C_1$–$C_{30}$ amines, preferably $C_1$–$C_{20}$, $C_5$ to $C_{12}$ alkanes, preferably $C_5$–$C_8$, such as hexane. The alkylhalides are preferably of from $C_1$ to $C_5$ and the arylhalides are from $C_6$ to $C_{10}$.

The reaction is normally but not necessarily, conducted in the absence of an excess of sulfide, selenide or telluride, although other starting materials may be present in excess. Since particle size depends on the rate of mixing of reagents, the reaction may be allowed to proceed instantly, upon total admixture of one reagent to the reaction solution yielding fine products or, upon the measured addition of small increments of one reagent to the reaction solution, the reaction not achieving totality for several days.

As previously stated, the reagents may be mixed neat, i.e., no added solvent, when this is feasible, or may be diluted with solvent. The use of solvent, therefore, is not critical to the reaction; however, when a solvent is utilized, it must be nonaqueous and anhydrous.

The temperature of the reaction may range from −78° to 400° C., yielding either amorphous $MX_2$ (at temperatures of from −78° to 200° C., preferably 25° to 200° C.) or layered sheet $(MX_2)_n$ (at temperatures of from 250° to 400° C., preferably 300°–400° C.). These temperatures are markedly lower than those needed when preparing dichalcogenides via solid state or gas phase methods wherein reaction temperatures up to and exceeding 1000° C. are commonplace. Further, the materials prepared are quite different than the product common in the art.

The products obtained from the low temperature nonaqueous precipitation technique are dichalcogenide, particularly disulfides, and have unique properties. For example, stoichiometric $NbS_2$ is difficult and/or impossible to prepare and stoichiometric $VS_2$ is impossible to prepare by high temperature methods. The particle size and crystallinity of these materials can be greatly varied by practicing the preparative methods of the instant invention. Small single crystals or high surface area powders which are amorphous to X-ray (i.e. give no X-ray pattern) can be obtained. Lack of X-ray pattern indicates a crystallite size of less than 0.05 micron (500Å). Surface areas can be raised to the point where the di-chalcogenide will remain suspended in solution and homogeneous dispersions created. This effect can be increased by using more polar nonaqueous solvents such as DMF or basic solvents such as pyridine which have a natural tendency to attach to the sulfur layers and cause dispersions. A preferred solvent is propylene carbonate. These same solvents are those which tend to intercalate in crystalline transition metal dichalcogenides. See Gamble et al., U.S. Pat. No. 3,766,064 for a list of such intercalation materials. Such dispersions can be gelled by proper variation of conditions or adsorbed on basic substrates such as CaO. The materials prepared by the process of the instant invention have utility as electrodes, and are useful in the preparation of intercalation compounds which are then useful as lubricants and superconductors. The above described amorphous materials of formula $MX_2$ wherein M and X are as previously defined, preferably $MoS_2$, $VS_2$ and $TiS_2$ more preferably $MoS_2$ and $VS_2$, prepared by the previously recited techniques has tremendous utility as an electrode, i.e. cathode in electric current producing cells wherein the cells comprise an anode active material selected from the group consisting of Gp IA, Gp IB, Gp IIA and Gp IIB metals of the Periodic Table of the Elements, preferably the Gp IA metals, most preferably lithium and an electrolyte which is chemically inert with respect to the anode and the cathode and which permits the migration of ions between said anode and said cathode.

Morphology of the $MX_2$ Compounds

The above-mentioned preparation allows one to choose between a wide range of particle size, crystallinity, surface area and sheet size compounds. Solids may be prepared which have the following properties.

A. High surface area, small particle size and amorphous crystallinity. Such characteristics are achieved by use of a solvent which may have the ability to form intercalation complexes with the chalcogenide. Alternatively, chalcogenides formed neat or in the absence of an intercalation solvent may be treated with an intercalating solvent to achieve the same result. Such intercalates may be a strong Lewis base such as pyridine, ammonia, $C_1$–$C_{20}$ amines, $C_1$–$C_{20}$ aldehydes, $C_3$–$C_{20}$ ketones, $C_1$–$C_{20}$ amides, heterocyclic bases, anilines and $C_2$–$C_{20}$ ethers, preferably pyridine or ammonia. The intercalated chalcogenide is then subjected to heat treating at between 75°–200° C. with pumping under vacuum when necessary to drive off the intercalating solvent leaving a high surface area, small particle size amorphous chalcogenide. Example: $TiS_2$ prepared from THF and treated with pyridine (intercalate pyridine and then drive it out at 150° C.) gave an amorphous X-ray pattern which indicates a crystallite size of at least less than 0.1 micron and a Brunauer, Emmett and Teller (BET) surface area of 100 m²/gm.

B. Low surface area, small particle size and amorphous crystallinity. Example: The same $TiS_2$ as mentioned in (A) if not treated with pyridine gave an amorphous X-ray pattern and a BET surface area of 10 m²/gm.

C. Low surface area, moderate particle size and high crystallinity. Example: $TiS_2$ prepared from refluxing acetonitrile yielded a $TiS_2$ X-ray pattern. The crystallinity of all materials can further be improved by annealing products.

D. Homogeneous dispersions: conditions can be arranged as above so that all or part of the di-chalcogenides remain in suspension as a homogeneous dispersion in solution. Such materials can be removed from solution by addition of a basic solid such as CaO. Example: $TiS_2$ prepared in propylene carbonate will result in a dark brown opaque dispersion of $TiS_2$. The $TiS_2$ may be absorbed by shaking the dispersion with CaO which is dark brown when dried. Correspondingly, the original solution is clear after treatment with CaO.

Solvents of choice for the preparation of homogeneous dispersions are propylene carbonate, dimethyl formamide pyridine, acetonitrile, benzonitrile, propionitrile, 1,2-dimethoxyethane, diglyme and N-methylformamide or other polar organic solvents, preferably those recited above.

E. High surface area composite: Di-chalcogenide/metal oxide solids. Composite materials may be prepared with the di- or poly-chalcogenide being absorbed on a metal oxide due to the Lewis acid nature of the chalcogenide. Example: The $TiS_2$/CaO material mentioned in Example D.

F. Gels and Glasses: Gels containing the di-chaldogenides may be produced by preparation in certain amines, such as trihexylamine. The gels produced yield glasses when the solvents are removed. Example: See Example 7.

The precipitation in nonaqueous solution causes the formation of stoichiometric products and effects reactions by virtue of the formation of insoluble precipitates, which reactions are incomplete at higher temperatures in aqueous or solid state systems. For example, $TiS_2$ may be prepared at from 450° C. to 600° C. by the reaction in the gas phase of $TiCl_4$ and $H_2S$. However, the efficiency of the reaction drops off at lower temperatures because the reaction is reversible.

$$TiCl_4 + H_2S \rightleftharpoons TiS_2 + 4\ HCl$$

Thus, $H_2S$ is not a practical sulfiding agent at temperatures less than 400° C.

When the reaction is conducted in nonaqueous solution at low temperature, however, the formation of insoluble precipitates causes the reaction to be irreversible and quantitative to $TiS_2$. The presence of a chalcogenide salt as an intermediate is important because $H_2S$ bubbled through a solution of $TiCl_4$ at room temperature will not produce a reaction. However, if $NH_3$ gas is first bubbled through the solution the passing of $H_2S$ through the ammonia rich solution causes $TiS_2$ to precipitate. This is due to the formation of $(NH_4)_2S$ or $(NH_4)HS$ as an intermediate and $(NH_4)Cl$ is the side product resulting from ion exchange. Thus, $NH_3$ mediates the reaction although $(NH_4)_2S$ is not necessarily actually isolated. If $NH_3$ and $H_2S$ are first coreacted, the intermediate salt is formed.

The product $MX_2$ wherein M and X are as previously described is separated from the anion salts which are co-for formed by filtering and using excess solvent or by pumping off the anion salts if they are volatile. For example, if LiCl is the product anion salt coprecipitated, excess solvent will dissolve it. If $NH_4Cl$ is the coproduct, pumping under vacuum will remove it (or washing may be used). However, pumping under vacuum may cause sulfur to be removed from the lattice to a greater or lesser extent. For example, $VS_2$ is not stable at higher temperatures. Pumping, as purification, utilized for $VS_2$ at 150° C. will cause sulfur to be removed which sulfur was supporting the 1:2 stoichiometric of the starting $VS_2$ and thereby providing a route to higher surface area, sulfur deficient compounds.

G. By subjecting the amorphous $MX_2$ product obtained above to controlled heating at from 250°–400° C., preferably 300°–400° C. in an atmosphere of 15% $H_2S/H_2$, one obtains sheets of $(MX_2)n$ wherein M and X are as defined and n is at least 20,000. This product can be either single sheets or systems of multiple sheets up to about 10 sheets in thickness. Put another way, the $(MX_2)_n$ product is a system of from about 6.2–62 Å in thickness, at least 500 Å wide and at least 500 Å long. This system can be described as being a sheet or multiple sheets of polymer, or as a "rag" structure.

A typical transmission electron micrograph (TEM) of an $MoS_2$ "rag" is shown in FIG. 1. The "rag" depicted consists of several stacked but highly folded and disordered $MoS_2$ layers. Although only 20–30 Å thick in the stack direction the layers are several thousand Å in extent perpendicular to the stack direction. By varying the conditions of preparation the number of stacks and the dimensions of the layers can be varied. The existence of the "rag" structure in $MoS_2$ demonstrates the flexibility and stability of the dichalcogenide layers.

EXAMPLES

Figure 1:
FIG. 1 is an electron micrograph of "Rag Structure" $MoS_2$ 1 mm≈100 Å.

All of the preparative work described was carried out either in a dry box or under a blanket of nitrogen. Both the starting metal (+4) and (+5) compounds and the sulfides and selenides thus afforded are sensitive to moisture and oxygen, especially in finely powdered form as results from the heterogeneous precipitation method described. All solvents were dried by standard techniques prior to use, and anhydrous reagents were always employed.

EXAMPLE 1—Preparation of $TiS_2$ ($ZrS_2$, $HfS_2$ and $VS_2$)

The following example employs as a starting material $TiCl_4$. It was found that the procedure worked equally well for $ZrCl_4$, $HfCl_4$, $MoCl_4$ or $VCl_4$. A solution of 10 millimoles of $TiCl_4$ (1.9 g) in tetrahydrofuran (75 ml) was made up in a dry box ($TiCl_4$ is not stable in air or moisture). To this stirred solution at room temperature was added 0.96 g (20 millimoles) of lithium sulfide. The yellowish solution immediately began to darken. The reaction was allowed to proceed several hours although it was essentially complete within one hour. The resulting dark brown solid was filtered and washed with 10 ml THF. From the combined filtrates 83% of calculated ideal yield of lithium chloride was isolated after evaporation of the solvent. An elemental analysis of the dark brown powder remaining after drying revealed it to be $TiS_2$ containing one-half mole of solvent tetrahydrofuran and less than 5% by weight LiCl. The analysis of other compounds prepared is listed below.

TABLE I

| Analyses | | Ti | S | Li | Cl | C | H |
|---|---|---|---|---|---|---|---|
| $TiS_2(LiCl . 3THF)_{0.25}$ | Calc | 27.18 | 36.23 | 1.00 | 5.02 | 20.38 | 3.39 |
| | Found | 27.37 | 36.19 | 1.27 | 4.41 | 16.73 | 2.93 |
| BET surface area 14.2 $m^2/g$ | | | | | | | |
| $MoS_2$ | | Mo | S | → | $MoS_{2.42}$ | (some unreacted | |
| | | 38.37 | 31.02 | | | $Li_2S$ present) | |
| $NbS_2$ | | Nb | S | → | $NbS_{1.97}$ | ratio | |
| | | 36.82 | 24.89 | | | | |
| $VS_2$ | | V | S | = | $VS_{2.0}$ | | |
| | | 27.50 | 34.70 | | | | |

The solvent could be removed by warming and pumping. This product was found to absorb a mole-equivalent of ammonia in about five minutes (as opposed to days or weeks for $TiS_2$ prepared by conventional means). No x-ray diffraction pattern was seen for the material due to its small crystal size (<0.1μ). The found BET surface area was about 10 $m^2/gm$ which could be raised to about 100 $m^2/gm$ by treating with pyridine and filtering and pumping to remove pyridine.

Other solvents which could be substituted for tetrahydrofuran were acetonitrile, propylene carbonate, acetic acid, dimethylformamide (DMF) or no solvent at all (run in excess $TiCl_4$), the reaction being run neat. In DMF and propylene carbonate a dispersion resulted in addition to the solid.

When sodium sulfide was substituted for lithium sulfide, the reaction required much more time at room temperature and the removal of the side product, sodium chloride from the dark $TiS_2$ was achieved by washing with 12% acetic acid. Alternatively, the sulfide source could be ammonium sulfide (prepared in situ by first adding excess ammonia to a tetrahydrofuran solution of $TiCl_4$ and subsequently bubbling in hydrogen sulfide). The side product in this latter case—ammonium chloride—could be removed by sublimation at 150° C. at 0.1 torr.

If the crystallinity of the product is desired to be enhanced, the dry powder can be partially annealed by heating several days at a temperature of 400° C. or less in inert atmosphere. By this process, a product exhibiting the x-ray diffraction pattern typical of $TiS_2$ was obtained.

Yet another means of enhancing the crystallinity of the product is to employ a Soxhlet apparatus whereby the $Li_2S$ is placed in a thimble over a refluxing solution of $TiCl_4$ in tetrahydrofuran. Platelets of $TiS_2$ thus result after several days in the lower solution.

Additional corroboration of the products is found in their (mull) infrared spectra. Thus, for instance $TiS_2$ as obtained by the procedure described in essentially identical to that seen for a sample of $TiS_2$ as obtained from Alfa Inorganics. The latter shows a broad band centered at 400 $cm^{-1}$ due to the Ti-S bond. The product of $TiCl_4$ and $Li_2S$ has a less broad band at 375 $cm^{-1}$ (the breadth is diminished by smaller crystal size).

EXAMPLE 2—Preparation of $TiS_2$ ($Zr_2$, $HFS_2$ and $VS_2$)

The following example employs as a starting material $TiCl_4$. It was found that the procedure worked equally well for $ZrCl_4$, $HFCl_4$ or $VCl_4$. 300 ml of 0.2 M $TiCl_4$ in acetonitrile was slowly added (drop/sec) to a refluxing solution of 0.6 M $Li_2S$ in acetonitrile. The solution was cooled, filtered and washed with methanol to remove the LiCl formed. This was then followed by an ether wash and the product dried on a Bucher funnel in a dry box. The resulting product was gold-brown and gave an x-ray pattern of $TiS_2$ with no further treatment.

EXAMPLE 3—Preparation of $NbS_2$ ($TaS_2$)

This procedure is applicable to those transition metals of Group Vb which form pentahalides (Vb and Ta) and the example is given for niobium pentachloride:

To a solution of 10 millimoles of $NbCl_5$ (2.68 g) in 50 ml tetrahydrofuran was added 1.15 g lithium sulfide (25 millimoles) and the reaction stirred in the dry box overnight. The dark product obtained on filtration was shown to contain 60% by weight $NbS_{1.97}$.

EXAMPLE 4—Preparation of Molybdenum Disulfide

Addition of 10 millimoles of molybdenum tetrachloride and 20 millimoles of lithium sulfide to 30ml THF with stirring results in a fine black solid which on filtration and drying contains 70% by weight/$MoS_2$. Most of the additional weight (60%) can be attributed to solvent which can be removed by heating to about 150° C. and pumping (1 torr).

EXAMPLE 5—Stable Homogeneous Dispersions

If the reactions $TiCl_4+A_2S$ herein described are carried out in appropriate media, stable homogeneous dispersions of $TiS_2$ in the liquid result (either accompanied or in the absence of the precipitated solid). For instance, if propylene carbonate (PC) is used as solvent, the supernatant phase will be a dark brown opaque dispersion which is unchanged on filtration (medium frit funnel) and which does not settle out over a period of weeks or months. Alternatively, if in addition to a nondispersing solvent (such as THF) a dispersing agent such as pyridine (or alkylamines) is initially present a similar dispersion will result. Murphy and Hull (*J. Chem. Phys.* 62 973 (1975)) have described dispersions of $TaS_2$ in aqueous media which are considerably less stable due to eventual decomposition of the sulfide by water (hydrolysis). In nonaqueous solutions such as those described in the instant invention such decomposition does not occur and stability remains for months.

The reaction of a solution of $TiCl_4$ in excess trihexylamine and tetrahydrofuran wth hydrogen sulfide provides another example of a means of dispersing the product $TiS_2$ in the media. The presence of the amine of the reaction mileau serves to disperse the extremely fine particles of the product they form. The dichalcogenides formed in such dispersions may be absorbed on high surface area carbons, refractory oxides and high surface area basic or acidic solids such as CaO, MgO, $Al_2O_3$ silica-alumina, the solution clearing with time.

EXAMPLE 6—Metal-Rich Products for V and Nb

Atempts to prepare stoichiometric disulfides of vanadium and niobioum via high temperature (>400° C.) techniques result in metal-rich products due to the vapor pressure of sulfur at elevated temperatures. By using the ambient temperature method described in this invention, essentially stoichiometric 2:1 sulfur to metal products result. Evidence (besides verifying analysis) is found in the behavior of our products on heating to 100° C. In this situation, sulfur is evolved and can clearly be visually perceived on the cooler parts of the tubes.

EXAMPLE 7—Gel and Glass Formation

To 40 mmol trihexylamine in 25 ml tetrahydrofuran, 10 mmol $TiCl_4$ was added. Then anhydrous hydrogen sulfide was sparged into the solution at a flow rate of about 1–5 cc/sec for five minutes. In the course of this addition, the solution became dark and somewhat more viscous. After the addition, the dark mixture was allowed to sit at room temperature overnight, resulting in a black gel which, if pumped and heated to greater than 300° C. yielded a black glassy solid having no x-ray powder diffraction pattern. Scanning electron microscopy (SEM) verified that the product was a glassy phase, and x-ray fluorescence analysis showed titanium and sulfur.

EXAMPLE 8—Ammonia Uptake

The transition metal dichalcogenides are known to absorb ammonia to form 1:1 products (U.S. Pat. No. 3,766,064, F. R. Gamble, R. A. Klemm and E. F. Ullman). The rate of this reaction depends on the surface area of the solid dichalcogenide (if ammonia vapor at ambient conditions is used). For instance, 100 mesh $TiS_2$ requires several days to react completely with ammonia. The $TiS_2$ prepared by the method outlined in Example 1, when contacted with ammonia vapor under ambient conditions in a gas buret absorbed one mole within five minutes (no more was picked up).

EXAMPLE 9—Reaction with n-Butyllithium

In a recent patent application (Ser. No. 817,630), it was disclosed that a general reaction of the Group IVb and Vb transition metal dichalcogenides is the formation of adducts of lithium using n-butyllithium. The disulfide products of the reactions described herein reacted rapidly with n-butyllithium to form such adducts:

| Reaction Product | Li Uptake From n-Butyllithium |
|---|---|
| $TiS_2$ | 1.09 |
| $VS_2$ | 1.48 |

EXAMPLE 10—Formation of an Intercalation Complex Directly

Ordinarily, using large crystal size transition metal dichalcogenides prepared by other means, sterically restricted amines such as 4-t-butylpyridine cannot intercalate between the layers and form inclusion compounds (Gamble et al, Science Vol. 74, pg. 493, 1971). However, if during the precipitation reactions described herein, such molecules are present, they will be included into the solid product which forms in situ. As an example, if 5 mmol of 4-t-butylpyridine is present in the THF solution when 10 mmol of $TiS_2$ is prepared via $TiCl_4$ and $Li_2S$, the product, a dry dark solid powder, will contain the amine.

EXAMPLE 11—Preparation of $US_2$ under Ambient Conditions (in Drybox)

A green solution was made up containing 3.70 g of $UCl_4$ (10 mmoles) in 100 ml THF. To this solution was added 0.92 g (20 mmoles) $Li_2S$ with stirring. The color darkened to brown and the reaction was stirred a day at room temperature. On filtering, washing with 20 ml THF and drying of the precipitate 3.07 g black powder (102% yield) resulted. An x-ray diffraction of this product showed no reflections due to the fine particle size.

In "Handbook of Preparative Inorganic Chemistry" V. 2 (second edition) edited by G. Brauer (Academic Press, 1965) on page 1446 is detailed the typical preparation of $US_2$ (from $UCl_4+H_2S$) at 600°–700°.

EXAMPLE 12—$Li_2Se+ZrCl_4$, $ZrSe_2$

Into 50 ml acetonitrile, 10 millimoles zirconium tetrachloride is added and then, with stirring 20 millimoles of lithium selenide is added portionwise. After allowing to stir several hours, the solid product is collected on a filter and washed with acetonitrile and dried. Thus, 10 millimoles of zirconium diselenide is afforded.

EXAMPLE 13—Polysulfide Preparation

Polysulfide may be prepared by adding the proper stoichiometric amount of sulfur with the $Li_2S$, as in the previous examples, to yield the appropriate $Li_2S_n$ for the desired reaction. Two examples of the preparation of known polysulfides are shown below:

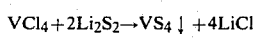

$$VCl_4 + 2Li_2S_2 \rightarrow VS_4 \downarrow + 4LiCl$$

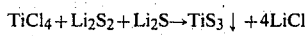

$$TiCl_4 + Li_2S_2 + Li_2S \rightarrow TiS_3 \downarrow + 4LiCl$$

However, this method is not limited to known polysulfides but is a route to previously unknown polysulfides such as $TiS_4$, $TaS_6$ etc. This method also yields dispersions, gels, etc. of these materials whose properties will not be governed by the chain-like morphology of the polysulfides.

EXAMPLE 14—Neat Preparation of Crystalline $TiS_2$ from $NH_3$, $H_2S$ and $TiCl_4$ Into a three-necked flask, a quantity of (approximately 5 grams) of $(NH_4)HS$ or $(NH_4)_2S$ was prepared by flowing in $NH_3$ gas and $H_2S$ gas. To the resulting white solid 3.8 gms of $TiCl_4$ (20 mmol) was added dropwise. A reaction immediately occurred yielding a black-brown solid, which was $TiS_2 + (NH_4)Cl$. This black-brown solid was removed from the flask and sealed in vacuum in a 20 mm diameter quartz tube which was 25 in. long. The tube was placed in a temperature gradient with one end at 380° C. and the other at 100° C. for one day. $(NH_4)Cl$ sublimed and condensed at the colder end thus effecting separation. At the hot end, the $TiS_2$ annealed yielding a perfect crystalline x-ray powder pattern.

EXAMPLE 15

The $MoS_2$ "rag" structure is prepared by the controlled heating of an intermediate amorphous $MoS_2$ phase which itself is prepared by chemical precipitation at room temperature. For example, addition of 10 millimoles of $MoCl_4$ (Ventron) and 20 millimoles of $Li_2S$ (Ventron) to 30 ml of tetrahydrofuran, with stirring, results in a fine black solid which on filtration and drying contains 70% by weight $MoS_2$. Repeated washings in THF remove byproduct LiCl and the remaining solvent is removed by heating at 100° C. in vacuum. The resulting material is amorphous $MoS_2$ which upon heating in a TGA in $N_2$ lost no more than 4% weight above 100° C. and had at this point the stoichiometry $MoS_{2.0}$. The resulting material prepared by heating amorphous $MoS_2$ was poorly crystalline $MoS_2$ having the layered $MoS_2$ molybdenite structure. By varying the heating time and temperature, one can vary the stack number (number of individual layers of trigonal prismatically coordinated $MoS_2$ layers). For example, the material shown in FIG. 1 was prepared by heating several grams of amorphous $MoS_2$ for two hours at 400° C. in a stream of $H_2/15\%$ $H_2S$. Materials consisting of the "rag" like $(MX_2)_n$ containing at least two layers give rise to well defined 002 X-ray reflections. The absence of this reflection in the X-ray diffraction pattern of the amorphous $MoS_2$ indicates that the "rags", if present at all in this material, are mostly individual layers.

The electron microscopy studies reported here were conducted using a Philips EM-300 high resolution microscope with a resolution of at least 2.5 Å. The sulfide samples were ground using a mullite mortar and pestle, and ultrasonically dispersed in heptane. A drop of the suspension was air dried on a carbon coated electron microscope grid for examination in the electron microscope. Magnifications were calibrated using a replica of a diffraction grating as the low magnification standard and the lattice image of the 3.44 Å spacing of the (002) planes in graphitized ISAF carbon black as the high magnification standard. Under these conditions, lattice images in the $MoS_2$ "rags" were often seen.

Figure 2:
FIG. 2 is an electron micrograph of rolled "dishrag" $MoS_2$.
Figure 3:
FIG. 3 is an electron micrograph of polymeric $MoS_2$.

In FIG. 2 we can see (002) planes giving repeat distance of $6.2 \pm 0.2$ Å which is consistent with the $MoS_2$ C axis repeat. The sheets were often rolled in cylinders which at lower magnification gave the appearance of needles. We can also see in the lower lefthand corner of FIG. 2 what appears to be a single sheet folded back on itself. Large areas consisted of highly folded $MoS_2$ as seen in FIG. 3 which showed very little evidence of ordered lattice images.

"Rag" like $MoS_2$ gave rise to smooth electron diffraction rings with strong maxima corresponding to d-spacing for the 100 and 110 planes of $MoS_2$. $0.0\ell$ maxima were rarely seen indicating that the layers were lying flat and a faint 201 was seen in some cases.

TABLE II

| Electron Diffraction Data ($\pm 0.03$ A) | | |
|---|---|---|
| d obs. | d calc. | hk$\ell$ |
| 2.74 | 2.74 | 100 |
| 1.58 | 1.58 | 110 |
| 1.36 | 1.36 | 201 |

This data is in agreement with the X-ray diffraction data described below.

Figure 4:
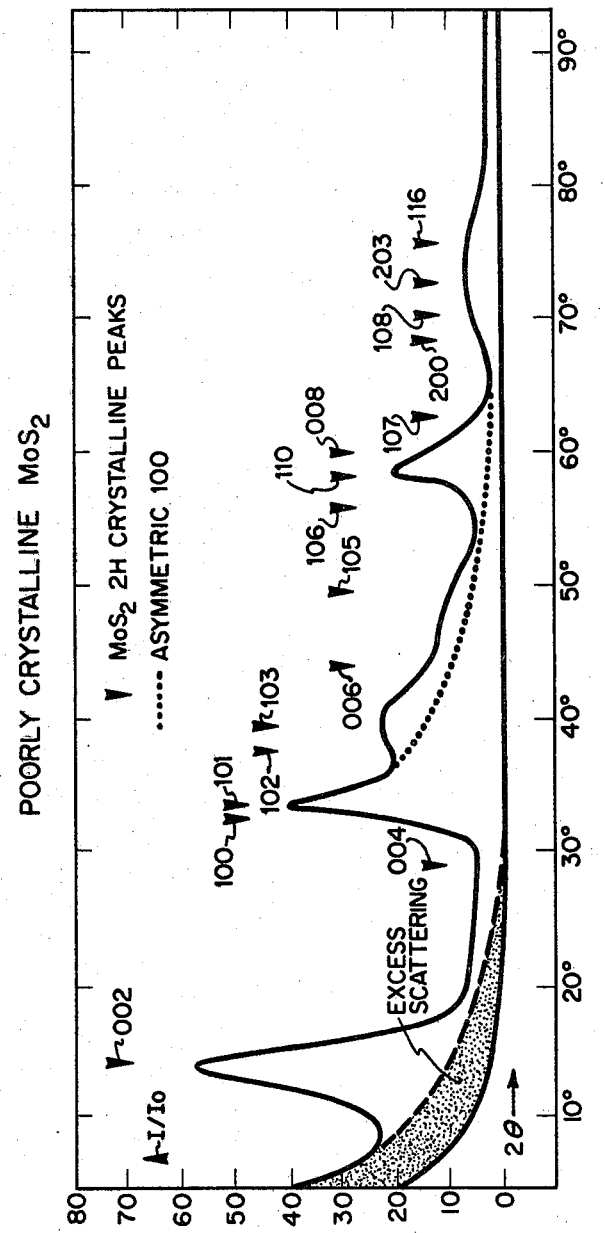
FIG. 4 is an X-ray powder diffraction patterns of poorly crystalline $MoS_2$.

X-ray powder diffraction patterns were obtained by lightly packing samples of the black powders into normal Phillip's X-ray powder sample holders and diffraction patterns were obtained on a standard Phillip's X-ray powder diffractometer using $CuK_\alpha$ radiation. A scan speed of $\frac{1}{8}°$ per minute was used with a chart speed adjusted to record 1° 2 $\theta$ in one inch. The base line was adjusted to read zero with the X-ray shutter closed and the scale-factor and time constant were adjusted to give a smooth curve with the largest maxima just on scale (typically a scale factor of 250 X and a time constant of 5 sec was used). Scans were generally run out to over 100° 2 $\theta$ which means that data collection time was approximately fourteen hours. FIG. 4 includes a typical X-ray scan which is characteristic of layered disulfides which are poorly crylstalline (i.e. rags) and is similar to that previously reported by Wildervanck and Jellinek for the $MoS_2$ produced by decomposition of $MoS_3$ (Zeitschrift Anorg. U. Allge. Chemie, Band 328, 309 (1964). The materials of the instant invention clearly differ however, from those of the reference, despite the similarity of X-ray pattern when comparison is made between the TEMs of the materials. The products of the reference are seen as small particles, a few hundred Å in size, whereas those of the instant invention are seen to be folded sheets (either single sheets or multiple sheets) which are at least 500 Å in length $\times$ 500 Å in width. The materials in sheet form can be several thousand A in length $\times$ width. They exhibit a strong 002 maxima in the low angle region and a broad envelope beginning approximately at 30° 2 $\theta$ and containing out to above 60° 1 $\theta$. This envelope contains the 100, 101, 102, 103, 006, 105, 106, 110 and 008 reflections with well-defined maxima appearing for the 100, 006 and 110 reflections. The well-defined maximum at 103 indicates that the 2H molybdenite stacking sequence is retained in some crystallites.

Line broadening analyses of the well-defined maxima were carried out in the standard manner (see A. Guinier, "X-Ray Diffraction in Crystals, Imperfect Crystals and Amorphous Bodies," W. H. Freeman and Co., San Francisco and London, 1963. These resulted in an average X-ray crystalline size of about 28 Å in the c-direction (approximately four MoS$_2$ layers) and 78 Å in the a-direction. The c-direction X-ray measurement is in reasonable agreement with the TEM, but clearly the a-axis dimensions observed by TEM were of much greater length (several thousand Å) than the X-ray values. The a-axis X-ray diffraction crystallite sizes only represents the average unstrained repeat distance within the 37 rags". This fact was also manifested in the observed N$_2$ BET surface area measurement of 18 M$^2$/gm. If it is assumed that the "rags" are infinite in extent, the surface area will depend only on the basal plane area and thus on the number of stacked sheets. The resulting formula for MoS$_2$ is:

$$\text{Surface Area (M}^2/\text{gm)} = 654/n$$

where n is the number of stacked sheets or "rags". For six to ten stacks (in reasonable agreement with TEM's), this yields calculated surface areas in the range of about 50–80 M$^2$/gm in better agreement with observed values but still higher indicating a greater degree of stacking than indicated by the X-ray order length in the c-direction.

The assymetric shape of the 100 envelope (as indicated in FIG. 4) is characteristic of random layer lattice structures in which the layers are displaced randomly with respect to one another like a spread deck of cards. They are stacked almost normally although the position of the 002 is displaced slightly to lower angles presumably due to imperfect stacking as has been described for graphite. When a mixed reflections such as the 103 appears, its line width indicates that the two layer molybdenite stacking sequence is maintained for at least two stacks as might be expected. It was also observed that pressing the "poorly crystalline" MoS$_2$ in a laboratory press at approximatley 15,000 lbs/in$^2$ significantly increased the sharpness of the X-ray reflection presumably indicating improved stacking of the "rags". We may also note from FIG. 4 that there is considerable non-Bragg scattering present at low angles. This may be due to uncorrelated single layers and the pore structure which they generate by randomly folding and connecting with other sheets.

All of the above observations are consistent with the stacking and folding of individual MoS$_2$ layers to form a highly disordered poorly crystalline MoS$_2$ rag structure.

EXAMPLE 16—Open Circuit Voltage of TiS$_2$ Electrode 1 gram of TiS$_2$ prepared in THF by the instant process was pressed into an aluminum grid to make a cathode. The open circuit voltage of this cathode was measured against Li° in a LiClO$_4$/THF/DME electrolyte and gave a value of 2.55 v and discharge to give 1,80 v and could be recharged. These voltages correspond to TiS$_2$ (2.55 v) and LiTiS$_2$ (1,80 v) further proof of the TiS$_2$ composition.

EXAMPLE 17—Use of VS$_2$ (as produced) in a Li Battery as Cathode

VS$_2$ is not known as a stoichiometric compound and has not been prepared by methods of the prior art. Such material prepared by the instant process, however, was reacted with n-butyllithium to give a composition Li$_x$VS$_2$ (0<X<1.5). The starting material has a 2:1 sulfur/vanadium ratio. The starting VS$_2$ has an open circuit voltage of about 2.45 volts and the lithiated material has an open circuit voltage of 1.80 volts against lithium. The reaction of n-butyllithium (Whittingham & Dines Mat. Res. Bull 10 287 (1975) and the favorable charged/discharged voltage make VS$_2$/LiVS$_2$ an attractive cathode material.

Vanadium sulfide compounds prepared in the past and characterized as being VS$_2$ were all prepared via high temperature techniques, i.e. over 400° C.

Experiments conducted in the course of developing the instant process have indicated that high temperature preparation of vanadium sulfides yields compounds of the formula V$_5$S$_8$, V$_2$S$_3$, etc. and not VS$_2$.

Vanadium sulfide compositions which are not VS$_2$ have been found to react with n-butyllithium only to the extent of 0.2 M maximum.

Such materials cannot be utilized as battery cathodes since the miniscule lithium take-up dramatically effects voltage consideration and charge-discharge abilities.

Vanadium sulfides prepared by the process of the instant invention, however, are of the formula VS$_2$ and take up 1.5 eq lithium upon admixture with n-butyllithium. Such behavior, which is similar to that of TiS$_2$ indicates that both structurally ad stoichiometrically TiS$_2$ and VS$_2$ prepared by the instant process are similar indeed, that VS$_2$ as such can be prepared. Supposed compounds of VS$_2$ prepared by prior art high temperature techniques differed markedly from TiS$_2$ (and from the VS$_2$ as now prepared), strong evidence that the compounds of the prior art are not truly VS$_2$.

EXAMPLE 18—Amorphous MoS$_2$ in a Li Battery as Cathode

Cathodes were prepared by pressing a mixture of the cathode material and 1- wt. % teflon into a stainless steel grid. The cathodes were surrounded by polypropylene separators and lithium sheet as the anodes. Cells were immersed in a 2M solution of lithium perchlorate in dioxolane contained in polypropylene bags. Cell data were obtained with Princeton Applied Research potentiostats and voltage limiting devices under constant current conditions.

A cell containing amorphorus MoS$_2$ was discharged at 1 ma (active area=2 cm$^2$) to a capacity of 492 coulomb/gm at 1.40 volts and subsequently repetitively cycled between 2.72 and 1.40 volts for a total of 244 cycles which demonstrates the remarkable reversibility of the amorphorus material. Crystalline MoS$_2$ under the same conditions had very low capacity (1–20 coulomb/gm in various experiments) and showed little reversibility, again demonstrating the superior behavior of the amorphous vs. the crystalline products.

What is claimed is:

1. A composition of the formula MX$_2$ which is amorphous to X-rays, wherein M is a metal selected from the group consisting of Group IVb, Group Vb, molybdenum and tungsten transition metals and X is a chalcogen selected from the group consisting of sulfur, selenium and tellurium.

2. The amphorous compositions of claim 1 wherein M is molybdenum and X is sulfur.

3. The amorphous compositions of claim 1 wherein M is niobium and X is sulfur.

4. The amorphous compositions of claim 1 wherein M is vanadium and X is sulfur.

5. A composition of the formula $Z(MX_2)_n$ wherein M is a metal selected from the group consisting of Group IVb, Vb, molybdenum and tungsten, X is a chalcogen selected from the group consisting of sulfur, selenium and tellurium and n is at least 20,000, the formula $(MX_2)_n$ representing a single sheet of the material $(MX_2)$ and Z is the number of such sheets from 1 to 10 existing in a stack, wherein the sheet or stack of sheets have the dimensions of about 6.2 to 62 Å in thickness, at least about 500 Å in length and at least about 500 Å in width.

6. The composition of claims 5 wherein the sheet or stack of sheets are from about 6.2 to 62 Å in thickness, at least about 1000 Å in length and at least about 1000 Å in width, and n is about 80,000.

7. The composition of claim 6 wherein M is molybdenum and X is sulfur.

8. The composition of claim 6 wherein M is titanium and X is sulfur.

9. The composition of claim 6 wherein M is niobium and X is sulfur.

10. Homogeneous dispersions of metal chalcogenides of the formula $MX_2$ wherein M is a transition metal selected from the group consisting of Group IVb, Vb, molybdenum and tungsten transition metals and X is a chalcogen selected from the group consisting of sulfur, selenium and tellurium prepared by mixing in the presence of a non-aqueous, aprotic polar organic solvent at at temperature of between $-78°$ to $400°$ C.:
   a. metal salts, the metal being selected from the group consisting of Group IVb, Group Vb, molybdenum and tungsten transition metals, and
   b. sources of sulfide, selenide or telluride ion, wherein said sources are selected from the group consisting of $Li_2X$, $Na_2X$, $K_2X$, LiHX, NaHX, KHX, $(NH_4)_2X$, $(NH_4)HX$, $(RNH_3)_2X$, $(RR'NH_2)_2X$, $(RR'R''NH)_2X$ wherein R, R' and R'' are the same or different and are selected from the group consisting of $C_1$ to $C_{20}$ alkyl and $C_6$ to $C_{20}$ aryl groups and X is the chalcogen selected from the group consisting of sulfur, selenium, and tellurium.

11. The homogeneous dispersions prepared as in claim 10 wherein the polar organic solvent is selected from the group consisting of propylene carbonate, dimethylformamide, pyridine, acetonitrile, benzonitrile, propionitrile, 1,2 demethoxyethane, diglyme and N-methyl formamide.

12. The homogeneous dispersions prepared as in claim 10 or 11 wherein the reaction temperature ranges from between $25°$ to $300°$ C.

13. The homogeneous dispersion prepared as in claims 10 or 11 wherein the chalcogen is sulfur.

14. The homogeneous dispersions prepared as in claims 10 or 11 further comprising the deposition of said homogeneous dispersion on high surface area supports, said supports being selected from the group consisting of high surface area refractory oxides and high surface area carbon.

15. The supported homogeneous dispersions prepared as in claim 14 wherein the high surface area supports are selected from the group consisting of CAO, MgO, $Al_2O_3$, silica-alumina and high surface area carbon.

16. The homogeneous dispersion prepared as in claim 10 or 11 wherein the anion of the metal salt is selected from the group comprising halides, sulfates, nitrates, carboxylates, perfluorocarboxylates wherein the carbonaceous moiety of the anion is a $C_1$ to $C_8$ hydrocarbon or fluorocarbon radical.

17. An electric current-producing cell, comprising:
   (a) an anode having as its anode-active material one or more metals selected from the group consisting of Group IA metals, Group IB metals, Group IIA metals and Group IIB metals of the Periodic Table of the Elements;
   (b) a cathode having as its cathode active material one or more compounds selected from the group consisting of amorphous $MX_2$ wherein M is a Group IVB, Group VB, molybdenum or tungsten transition metal and X is a chalcogen selected from the group consisting of sulfur, selenium and lithium which $MX_2$ material is prepared by the method comprising reacting at a temperature of between $-78°$ to $400°$ C;
   (i) metal salts, the metal being selected from the group consisting of Group IVB, Group VB, molybdenum and tungsten transition metals, and
   (ii) sources of sulfide, selenide or lelluride ion, wherein said sources are selected from the group consisting of $Li_2X$, $Na_2X$, $K_2X$, LiHX, NaHX, KHX, $(NH_4)_2X$, $(NH_4)HX$, $(RNH_3)_2X$, $(RR'NH_2)_2X$, $(RR'R''NH)_2X$ wherein R, R' and R'' are the same or different and are selected from the group consisting of $C_1$ to $C_{20}$ alkyl and $C_{10}$ to $C_{20}$ aryl groups and X is the chalcogen selected from the group consisting of sulfur, selenium and tellurium, reactants (i) and (ii) being reacted in the absence of an aqueous-protic solvent.
   (iii) an electrolyte which is chemically inert with respect to said anode and said cathode and which permits the migration of ions between said anode and said cathode.

18. The electric current producing cell of claim 17 wherein the $MX_2$ material is amorphous $VS_2$, $MoS_2$ or $TiS_2$.

19. The electric current producing cell of claim 17 wherein the $MX_2$ material is amorphous $VS_2$.

20. The electric current producing cell of claim 17 wherein the $MX_2$ material is amorphous $MoS_2$.

21. The electric current producing cell of claim 17, 18, 19 or 20 wherein the amorphous $MX_2$ material is prepared in the absence of a non-aqueous solvent selected from the group consisting of acetonitule benzonitule, propronitule, acetone, $C_1$–$C_{20}$ aryl-halides 1,2 demethoxyelhane, deqlyne, N-methyl formamide, dimethylformamide, aromatics of $C_6$–$C_{30}$ amines, $C_5$–$C_{12}$ alkanes, $C_4$–$C_8$ ethers, propylene carbonate $C_4$–$C_8$ esters, molten sulfur, sulfur dioxide.

22. The electric current producing cell of claims 17, 18, 19 or 20 wherein said anode has as its anode active material one or more metals selected from the Group IA metals.

23. The electric current producing cell of claims 17, 18, 19 or 20 wherein the anode has lithium as its anode active material.

24. The electric current producing cell of claim 21 wherein the anode has lithium as its anode active material.

25. The electric current producing cell of claim 17 wherein the anion of the metal salt of (b) (i) is selected from the group comprising halides, sulfates, nitrates, carboxylates, perfluorocarboxylates wherein the carbonaceous moiety of the anion is a $C_1$ to $C_8$ hydrocarbon or fluorocarbon radical.

* * * * *